3,405,190
PROCESS FOR PREPARING CYCLOHEXANE
Johan D. Logemann, Stein, and Theodorus J. van der Mond, and Waltherus H. Castenmiller, Geleen, Netherlands, assignors to Stamicarbon N.V., Heerlen, Netherlands
No Drawing. Filed Nov. 8, 1965, Ser. No. 506,826
Claims priority, application Netherlands, Nov. 12, 1964, 6413156
6 Claims. (Cl. 260—667)

The present invention relates to a process for preparing cyclohexane by catalytic hydrogenation of benzene containing contaminating sulphur compounds.

It is commonly known (see, for instance, the Netherlands patent application 197,027) to use metals of the platinum group, usually on an aluminium-oxide carrier, as catalysts in the hydrogenation of benzene. These catalysts are reversibly poisoned by sulphur compounds, the degree of poisoning, and consequently the catalytic activity, being dependent on the partial hydrogen pressure, the reaction temperature, and particularly on the amount of sulphur compounds contained in the benzene to be hydrogenated.

Practice has shown that, to obtain optimum results, the concentration of sulphur compounds in the benzene must be kept below 0.5 milligram per litre (calculated as sulphur). If the sulphur content of the benzene is higher than this value, incomplete hydrogenation is obtained under the conditions of partial hydrogen pressure and temperature that are optimum at sulphur contents below this value.

To obtain a complete hydrogenation of benzene at their higher sulphur contents it is necessary to carry out the hydrogenation under conditions wherein a higher partial hydrogen pressure and/or temperature prevail on the outlet side of the reactor (for the completeness of the hydrogenation is determined by the conditions at the outlet side of the reactor). However, higher partial hydrogen pressures on the outlet side of the reactor cause high hydrogen losses, because the hydrogen content of the inert gases discharged from the reaction system necessarily increases, while the temperature cannot be raised without limit since this shifts the position of equilibrium of the benzene-hydrogen-cyclohexane.

This invention provides a novel and improved process whereby impure benzene with a sulphur content above 0.5 milligram per litre may be completely hydrogenated without an increase in hydrogen losses. This process is characterized in that, in a first reaction zone, the benzene, in the gaseous form and mixed with hydrogen or a gas containing hydrogen, is passed over a catalyst containing one or several noble metals of the platinum group at such a pressure and temperature that only partial hydrogenation of the benzene is achieved while virtually all the sulphur of the sulphur contaminants is converted to hydrogen sulphide. The resulting reaction mixture is next passed through a hydrogen-sulphide absorption zone, and the hydrogenation of the benzene is then completed in a second reaction zone.

The hydrogenation step in the first reaction zone is preferably carried out in a tubular reactor provided with external liquid cooling means to permit rapid removal of the heat evolved in the highly exothermic reaction. The reaction mixture consequently remains only briefly at the peak temperature of this reaction, whereby the formation of undesired secondary products is minimized, while the temperature is nevertheless sufficiently high to convert the sulphur of the sulphur compounds, such as thiophene, into hydrogen sulphide.

The hydrogen-sulphide absorption and the second stage hydrogenation in the second reaction zone may be carried out according to various generally conventional methods. Preferably, the hydrogenation in the second reaction zone is carried out in gaseous phase, and the pressure used in the second reaction zone and in the hydrogen-sulphide absorption zone is similar to that in the first reaction zone.

It is not necessary to use the same type of catalyst in the second and first reaction zones, in as much as the reaction mixture feed passed into the second reaction zone is provided completely free of sulphur poisons, use may also be made in the second reaction zone of a hydrogenation catalyst which is irreversibly sulphur-poisoned, such as, for instance, a nickel catalyst.

In the first reaction zone the conditions are preferably so chosen that at least 90% of the benzene in this zone is hydrogenated. It is then possible to carry out the hydrogenation of the second reaction zone in a simple adiabatic reactor without supply or discharge of heat while still obtaining the desired complete hydrogenation.

To absorb the hydrogen sulphide in the hydrogen-sulphide absorption zone, various metallic oxides, such as iron oxides and manganese oxides, are suitable. However, use is preferably made of zinc oxide, as this can absorb hydrogen sulphide up to 15% of its weight before hydrogen-sulphide is allowed to pass. The absorption of hydrogen-sulphide may be effected without supply or discharge of heat at a temperature similar to that at which the reaction mixture leaves the first reaction zone, so that, like the second reaction zone, the hydrogen-sulphide absorption zone may be a simple adiabatic reactor. The hydrogen that has passed the second reaction zone is, as a rule, returned into the process and need no more be freed of hydrogen-sulphide, as was required in other known processes.

Some examples will now be given to elucidate the invention but it will be understood that the invention is not limited to these specific embodiments.

Example 1

In a tubular reactor, benzene containing thiophene in an amount of 1 milligram per litre (expressed as sulphur) was continuously hydrogenated with a hydrogen-nitrogen mixture (59% hydrogen) over a catalyst compound of platinum on aluminum oxide (0.3% by weight of platinum), at a total pressure of 25 atmospheres. Per mole of benzene, 5.3 moles of hydrogen were passed into the reactor. The reaction heat was discharged by cooling the reactor with oil, and the oil temperature was maintained at 220° C., while the maximum temperature in the reactor was 400° C. The space velocity was 2 litres of benzene (calculated as liquid) per litre of catalyst and per hour. The reaction mixture from the reactor was then passed over zinc oxide, in the form of grains of 5 millimetres in diameter, under the existing conditions of temperature and pressure, and subsequently through a second reactor which was not cooled. In this second reactor the benzene still contained in the reaction mixture was virtually completely hydrogenated with the same type of catalyst as that used in the first reactor. The amount of catalyst used in the second reactor was 12% of the amount used in the first. The reaction mixture obtained from the second reactor was then cooled so that the resulting cyclohexane could be separated from the non-condensed hydrogen-nitrogen mixture as a liquid. Part of this hydrogen-nitrogen mixture (85% hydrogen), was returned to the first reactor. The amounts of hydrogen-nitrogen mixture to be discharged and to be freshly added were so adjusted that a stationary state was obtained. The gas discharged contained 38% of hydrogen, which means a loss of 0.37 mole of hydrogen per mole of cyclohexane. The benzene content of the cyclohexane separated off was only 0.03%.

When this experiment was repeated, but without the use of a second reactor, the benzene content of the cyclohexane appeared to be 2%. To obtain a benzene content of the cyclohexane of 0.05% without a second reactor, it was necessary to pass 6.5 moles of hydrogen per mole of benzene into the first reactor at the same total pressure and space velocity. In the stationary state the hydrogen content of the gas discharged was 55% in this case, which means a loss of 0.83 mole of hydrogen per mole of cyclohexane.

In all cases the amount of impurities other than benzene contained in the cyclohexane was smaller than 0.02%.

Example 2

In a tubular reactor, benzene containing ethyl mercaptan in an amount of 5 milligram per litre (expressed as sulphur) was continuously hydrogenated with a hydrogen-nitrogen mixture (80% hydrogen) over a catalyst compound of platinum on aluminum oxide (0.3% by weight of platinum), at a total pressure of 30 atmospheres. The space velocity was 2 litres of benzene (calculated as liquid) per litre of catalyst and per hour, while per mole of benzene 5 moles of hydrogen were passed into the reactor. The reaction heat was discharged by cooling the reactor with pressurized water. The temperature of the water was 205° C. and the maximum temperature in the reactor 403° C. The reaction mixture from the reactor was then passed over a granular mass of zinc oxide under the existing conditions of temperature and pressure, and subsequently through a second reactor which was not cooled. Per litre of the zinc-oxide mass, 5000 litres (calculated to 0° C. and a pressure of 760 mm. Hg) of the gaseous reaction mixture were passed through per hour. The second reactor contained the same type of catalyst as the first in an amount that was 25% of the amount in the first reactor.

Under these conditions the cyclohexane, which was separated from the reaction mixture from the second reactor by cooling, appeared to contain only 0.06% of benzene and less than 0.02% of other impurities. After 3300 hours the zinc oxide appeared to have absorbed about 10% of its weight of sulphur as hydrogen-sulphide, while the purity of the cyclohexane separated off had remained the same.

When cyclohexane was separated from the reaction mixture after the first reactor, this cyclohexane appeared to contain 6% of benzene.

Example 3

An experiment similar to that given in Example 2 was carried out except for the following conditions: sulphur content of the benzene: 2.5 milligrams per litre (present as thiophene); per mole of benzene, 6 moles of hydrogen were passed through in the form of a hydrogen-nitrogen mixture (64% hydrogen); the cooling-water temperature was 225° C. and the maximum temperature in the first reactor 354° C.; instead of granular zinc oxide, granular manganese oxide was used, through which 1500 litres (calculated to 0° C. and a pressure of 760 mm. Hg) of the gas mixture per litre of manganese oxide were passed per hour; the amount of catalyst in the second reactor was 40% of that in the first reactor.

Under these conditions, the cyclohexane, which was separated from the reaction mixture from the second reactor by cooling, contained 0.07% of benzene and less than 0.04% of other impurities.

When cyclohexane was separated from the reaction mixture from the first reactor, this cyclohexane appeared to contain 3.1% of benzene.

As stated, the foregoing examples are merely illustrative of the practice of this invention. In general, the process of this invention may be conducted under conditions such that the benzene is maintained in the gaseous phase, at least in said first reaction zone, and preferably in said hydrogen sulphide absorption zone and said second reaction zone as well, for best results. This requires merely a balancing of the pressures employed, in combination with the temperatures employed, to maintain such conditions. The temperature used should be, as stated, sufficient to convert substantially all of the sulphur content of the sulphur compounds contaminating the benzene feed into hydrogen sulphide.

It will be understood that various benzene feeds may be used in the practice of this invention and that such feeds will vary as to the specific identity of the contaminating sulphur compounds. Accordingly, in the operation of this invention, it would be a routine first step to conduct simple experiments to determine what minimum temperature is required to effect the required sulphur hydrogenation to hydrogen sulphide and thereafter to establish the combination of reaction conditions regarding temperature and pressure, appropriate for the specific benzene feed to be used and within and according to the principles of the invention as stated above.

It will be further understood that the scope of this invention is therefore limited only by the spirit and scope of the following claims.

What is claimed is:
1. In processes for the preparation of cyclohexane by catalytic hydrogenation of benzene containing sulphur compounds, the improvements comprising in combination, the steps of mixing benzene in gaseous phase with hydrogen, passing the resulting gas mixture over a catalyst containing a platinum group metal in a first reaction zone while maintaining the pressure and temperature at a level whereby said benzene is partially hydrogenated while hydrogenating substantially the entire sulphur content of said sulphur compounds to hydrogen sulphide, and subsequently passing the resulting reaction gaseous mixture through a hydrogen sulphide absorption zone where substantially all of the hydrogen sulphide is removed from the said reaction gaseous mixture, and thereafter completing the hydrogenation of said benzene containing gaseous reaction mixture from which hydrogen sulphide has been removed in a second reaction zone.

2. The process according to claim 1 wherein the hydrogenation in the first reaction zone is carried out in a tubular reactor with external liquid cooling.

3. The process according to claim 1 wherein the hydrogenation in the second reaction zone is carried out in the gas phase and substantially the same total pressure is used in each of the first reaction zone, the second reaction zone and the hydrogen sulphide absorption zone.

4. The process according to claim 1 wherein at least 90% of the benzene is hydrogenated in said first reaction zone, and said second reaction zone is maintained under adiabatic reaction conditions.

5. The process according to claim 1 wherein the absorption agent used in said hydrogen sulphide absorption zone is zinc oxide.

6. The process of claim 1 wherein hydrogen gas of such purity that further purification is not required, is separated from the reaction mixture of the second reaction zone and the said gas is at least in part recycled to the feed of the process.

References Cited

UNITED STATES PATENTS

| | | | |
|---|---|---|---|
| 2,515,279 | 7/1950 | Van Der Hoeven | 260—667 |
| 3,063,936 | 11/1962 | Pearce et al. | 208—212 |
| 3,304,338 | 2/1967 | Parish | 260—667 |

DELBERT E. GANTZ, *Primary Examiner.*

V. O'KEEFE, *Assistant Examiner.*